Nov. 13, 1951 E. O. HILLER 2,575,220
APPARATUS FOR TRANSFERRING BOTTLES
Filed June 19, 1948 5 Sheets-Sheet 1

INVENTOR
EVERETT O. HILLER
BY Parham & Bates
ATTORNEYS

Nov. 13, 1951          E. O. HILLER          2,575,220

APPARATUS FOR TRANSFERRING BOTTLES

Filed June 19, 1948          5 Sheets-Sheet 2

INVENTOR
EVERETT O. HILLER
BY Parham & Bates
ATTORNEYS

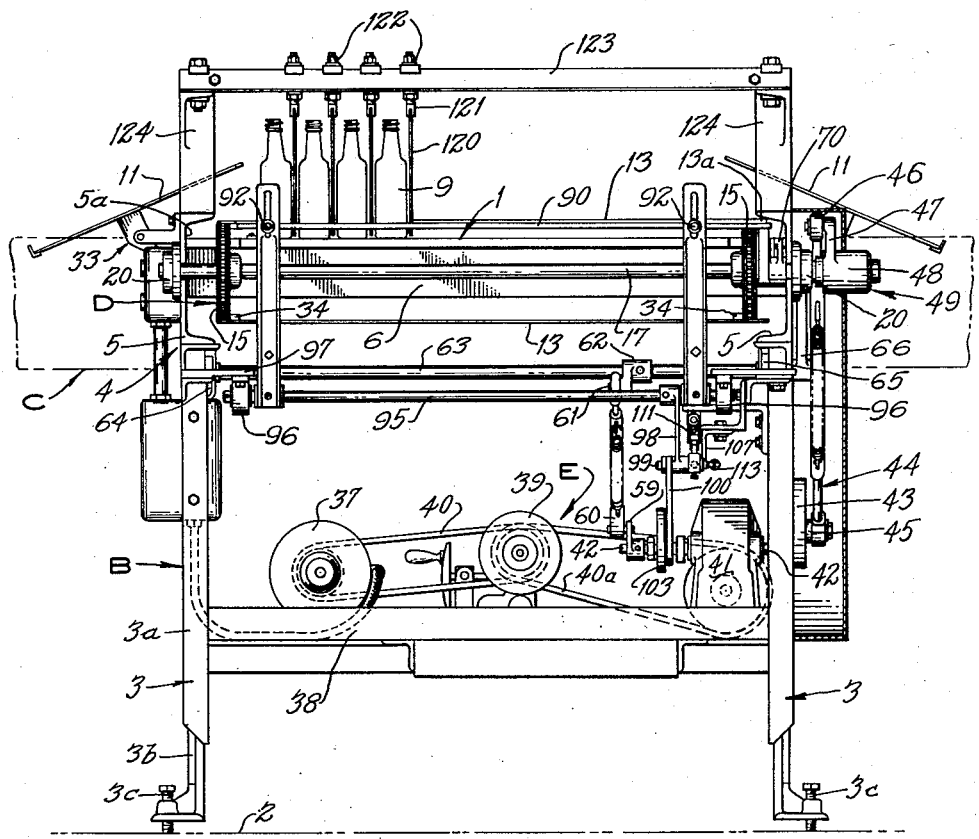
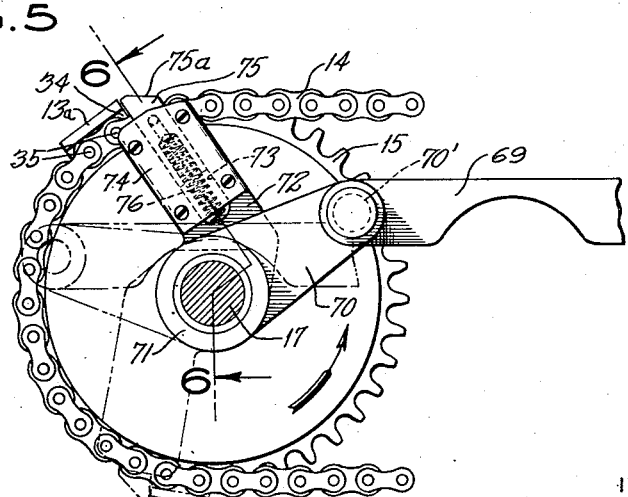
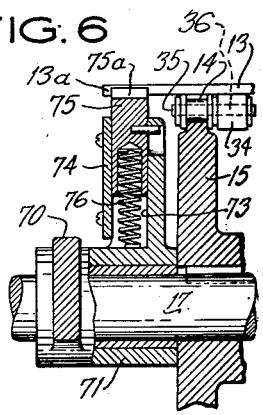
INVENTOR
EVERETT O. HILLER

Nov. 13, 1951  E. O. HILLER  2,575,220
APPARATUS FOR TRANSFERRING BOTTLES
Filed June 19, 1948  5 Sheets-Sheet 4
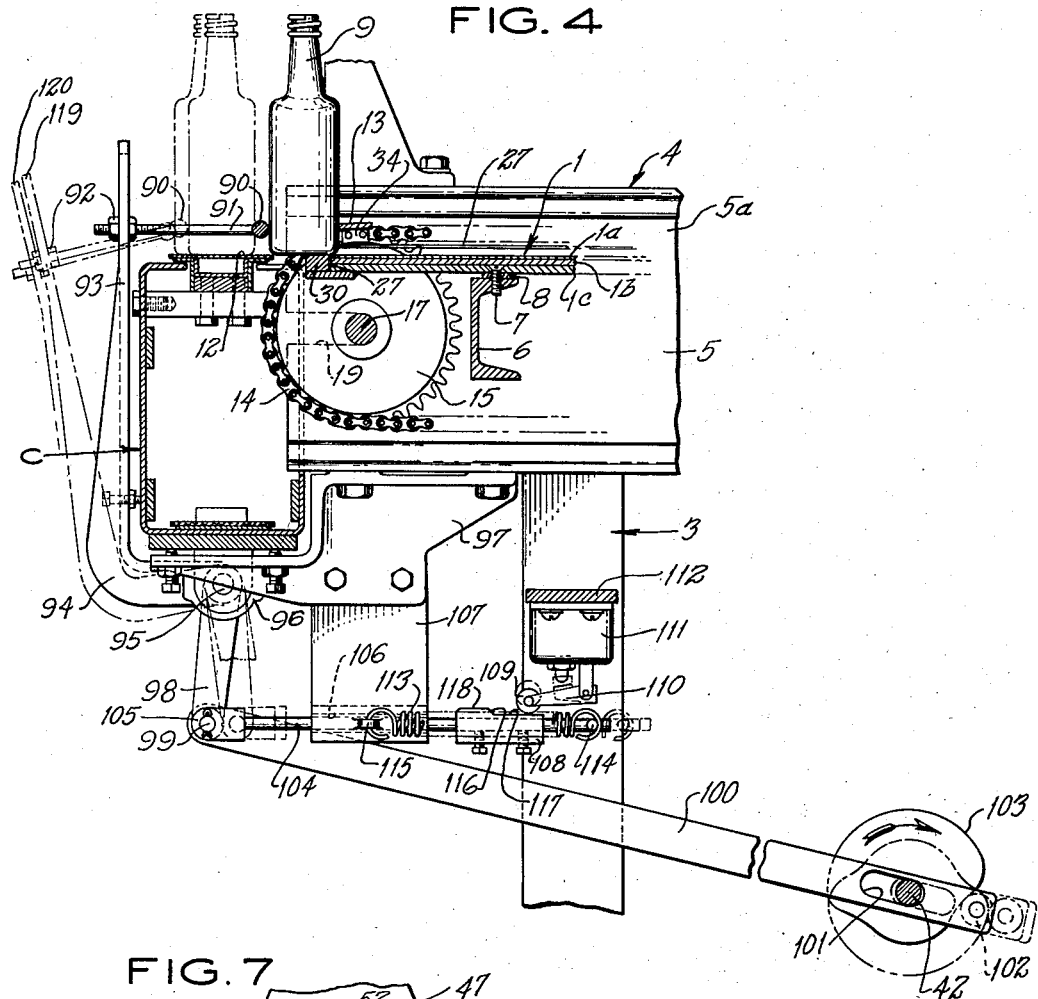
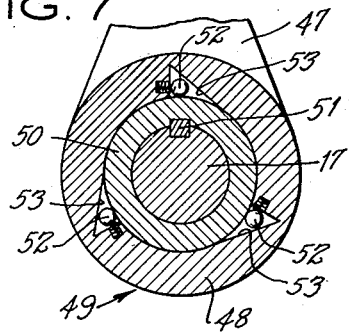
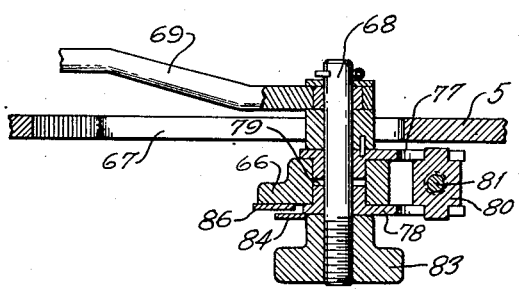
INVENTOR
EVERETT O. HILLER
BY Parham + Bates
ATTORNEYS Nov. 13, 1951          E. O. HILLER          2,575,220
APPARATUS FOR TRANSFERRING BOTTLES
Filed June 19, 1948          5 Sheets-Sheet 5
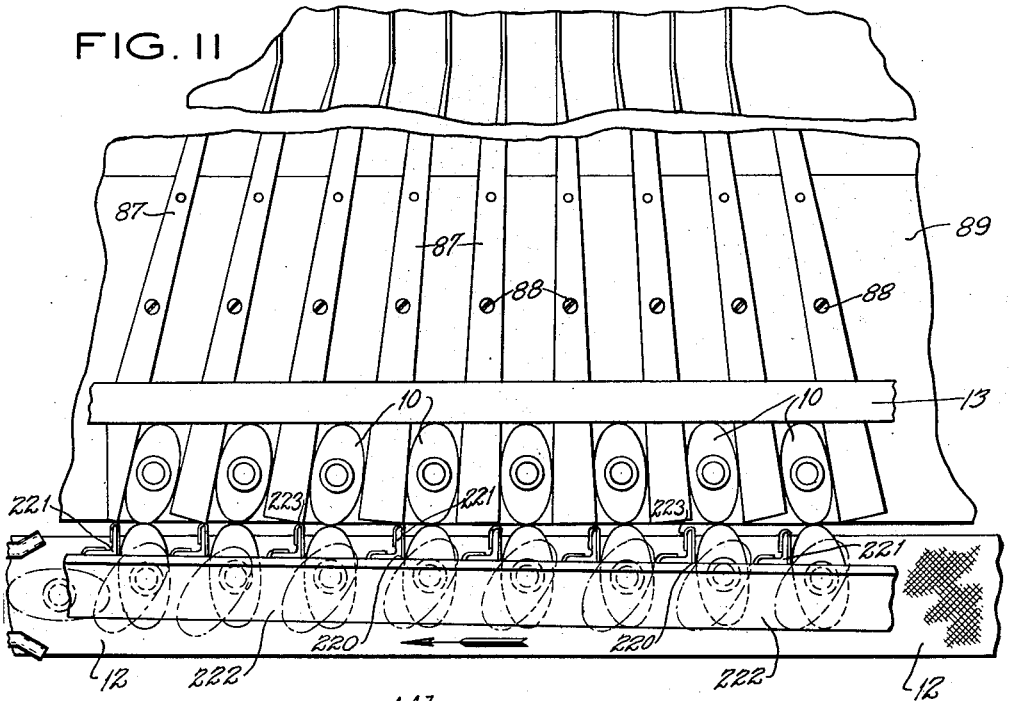
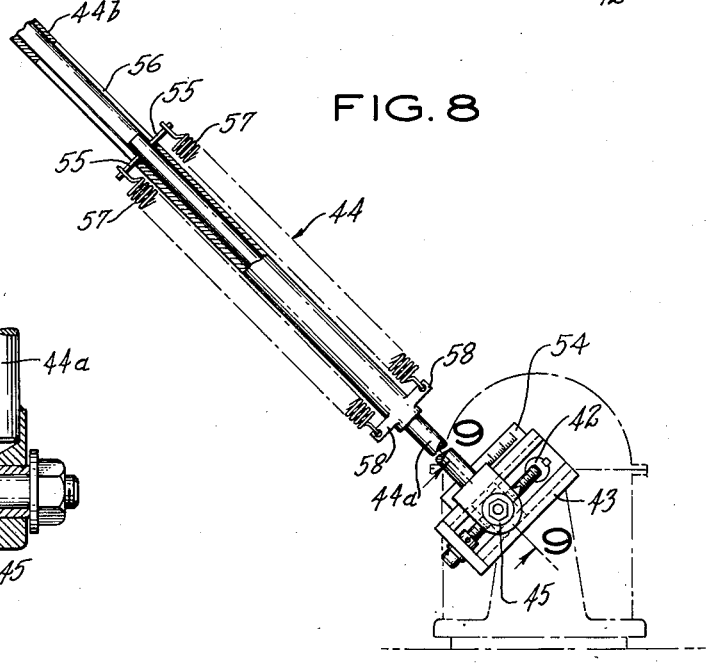
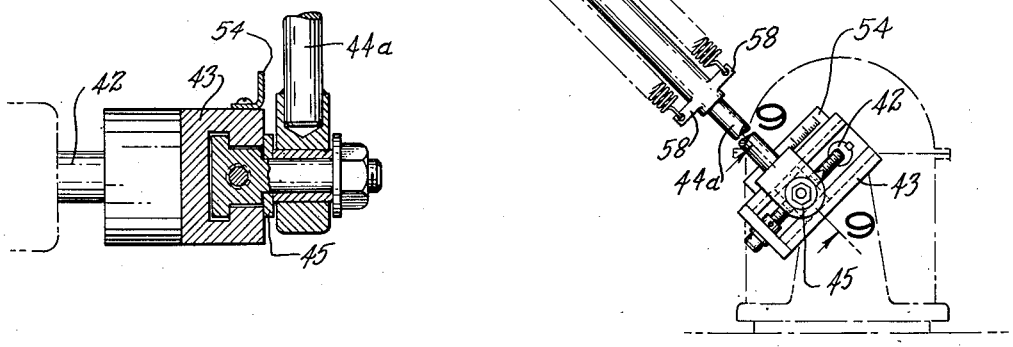
INVENTOR
EVERETT O. HILLER
BY Parham + Bates
ATTORNEYS

UNITED STATES PATENT OFFICE 2,575,220

APPARATUS FOR TRANSFERRING BOTTLES

Everett O. Hiller, Hartford, Conn., assignor to Emhart Manufacturing Company, a corporation of Delaware Application June 19, 1948, Serial No. 33,948

18 Claims. (Cl. 198—32)

This invention relates generally to improvements in apparatus for transferring and arranging glass containers, such as bottles and jars, or the like and more particularly to the transfer from a receiving surface to a conveyor and disposition thereon in single file order of containers which were placed on the receiving surface in groups or lots, each comprising a plurality of rows of the articles, as when all the containers in a conventional shipping case or carton are delivered onto the receiving surface without substantial change of their relative positions.

An apparatus of the character described is disclosed in the copending application of Robert U. Rourke for Article Handling and Transfer Apparatus and Method filed January 29, 1947, Serial No. 725,142, owned by the owner of the present application. The apparatus of the Rourke application discloses a horizontal supporting surface on which are provided parallel guideways leading to one end thereof. Spaced transfer pusher bars are carried and moved by endless carrier chains which respectively are located at opposite sides of the supporting surface. Successive groups or lots of containers may be delivered, as from their cartons, onto the supporting surface between adjacent transverse bars. All the spaced transverse bars and their carrier chains are moved intermittently in unison by a suitable driving mechanism so that each transverse bar over the supporting surface is advanced toward the aforesaid end of the supporting surface by successive steps, the amplitude of movement of such bar at each step being adjustable to correspond approximately to the diameter of each of the containers to be moved along the supporting surface at any given time. On reaching the aforesaid end of the supporting surface of the Rourke apparatus, each transverse pusher bar is moved downwardly against a spring pressed, downwardly openable, pivoted gate and, on opening of the latter, passes through a gap thus provided between the end of the supporting surface and an adjacent dead plate and is returned beneath the supporting surface. The rows of containers of a group which were advanced over the supporting surface by that transverse bar will have been moved by it onto and in part across the dead plate and onto a transversely disposed conveyor on the far side of the dead plate from the supporting surface, the width of the dead plate being approximately a multiple of each of the containers being transferred and arranged at a given time.

In the operation of the apparatus of the Rourke application, the last cross row of containers of a group in advance of any of the transverse bars of the apparatus will be spaced from the foremost cross row of containers being pushed by the next transverse bar and this results in gaps or spaces at intervals in the file of containers on the outgoing conveyor. This may necessitate driving the conveyor at a relatively high speed in order to afford an opportunity for corrective spacing by a known device of the containers before they are presented to a washing, filling, labelling or other machine in the packing line. The high speed increases the hazard of overturning of the individual containers and the gaps at intervals between successive containers on the conveyor are undesirable for this and other reasons.

An object of the present invention is to cure the above described and other shortcomings of the Rourke type of apparatus for conveying and arranging glass containers and the like and to make further important and useful changes therein.

In attaining this object, the present invention provides an apparatus constructed and arranged to effect delivery intermittently at uniform predetermined intervals of successive front cross rows of containers from one end of a receiving surface to an outgoing cross conveyor, such containers having been placed on the receiving surface in groups or lots, as from different cartons, respectively, disposed on the receiving surface in advance of different, spaced transverse pusher bars.

The invention also provides improvements in the mechanism for driving the transverse pusher bars so as to simplify and increase the speed, ease and range of adjustment thereof to adapt the apparatus for use at different times with different sizes of containers and cartons. The invention dispenses with a dead plate between the receiving surface and the outgoing cross conveyor and this obviates need of interchange of dead plates of different widths to adapt the apparatus for use with containers of different diameters.

The invention further improves the pre-existing apparatus by providing a relatively simple and efficient means to steady the containers of each cross row during movement thereof onto the outgoing cross conveyor and to prevent such containers from being turned angularly about vertical axes by the drag thereon of the outgoing conveyor until such containers have been moved bodily far enough onto the conveyor to remain upright in a desirable angularly turned position thereon when their support is taken over by the conveyor.

Another improvement feature of advantage is the combination with the container steadying means of automatic means to stop the driving mechanism of the apparatus should containers form a jam during transfer thereof to the outgoing cross conveyor.

A still further improvement feature is the prevention of lateral drifting of the containers from straight forward paths of movement without interference with proper positioning of the component rows of each group or lot of containers as the latter are unloaded from a carton or the like onto a portion of the receiving surface of the apparatus.

Still other objects and detailed advantages of the invention will hereinafter be pointed out or will become obvious from the following description of a practical embodiment of the invention as shown in the accompanying drawings, in which:

Fig. 3 is an end view of the apparatus, with an outgoing conveyor thereof shown only fragmentarily and by phantom lines and with a side casing or cover in vertical section;

Fig. 4 is a relatively enlarged fragmentary view, mainly in side elevation but partly in section, of the delivery end portion of the apparatus, showing a yieldable container steadying mechanism of the apparatus in three different positions;

Fig. 5 is a relatively enlarged fragmentary view of a portion of a rocking pawl mechanism for periodically driving the container moving mechanism of the apparatus, together with a sprocket and a portion of a chain of the container moving mechanism, the view showing two different positions of the rocking pawl;

Fig. 6 is a section along the line 6—6 of Fig. 5;

Fig. 7 is a relatively enlarged section through a one-way clutch or coupling of the main driving mechanism of the apparatus;

Fig. 8 is a detail view of a crank and a portion of a connecting rod operated thereby and included in the main driving mechanism;

Fig. 9 is a relatively enlarged section along the line 9—9 of Fig. 8;

Figure 2:
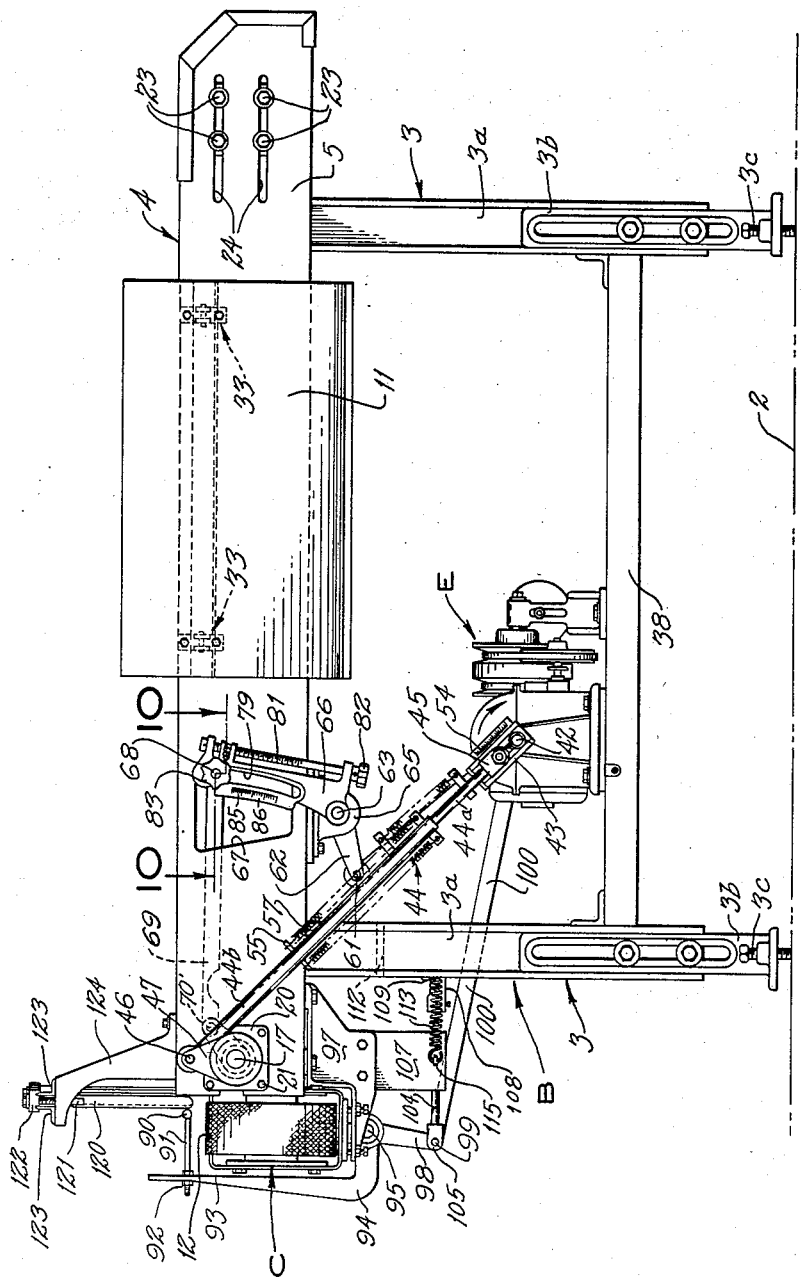
Fig. 2 is a side elevation of the apparatus.

Fig. 10 is a fragmentary section along the line 10—10 of Fig. 2, showing details of an adjustable pivotal connection between elements of the mechanism for operating the rocking pawl; and Fig. 11 is a fragmentary plan view of a modified form of apparatus which is particularly suitable for use when the containers being transferred and arranged by the apparatus have bodies which are oblong in cross section.

Figure 1:
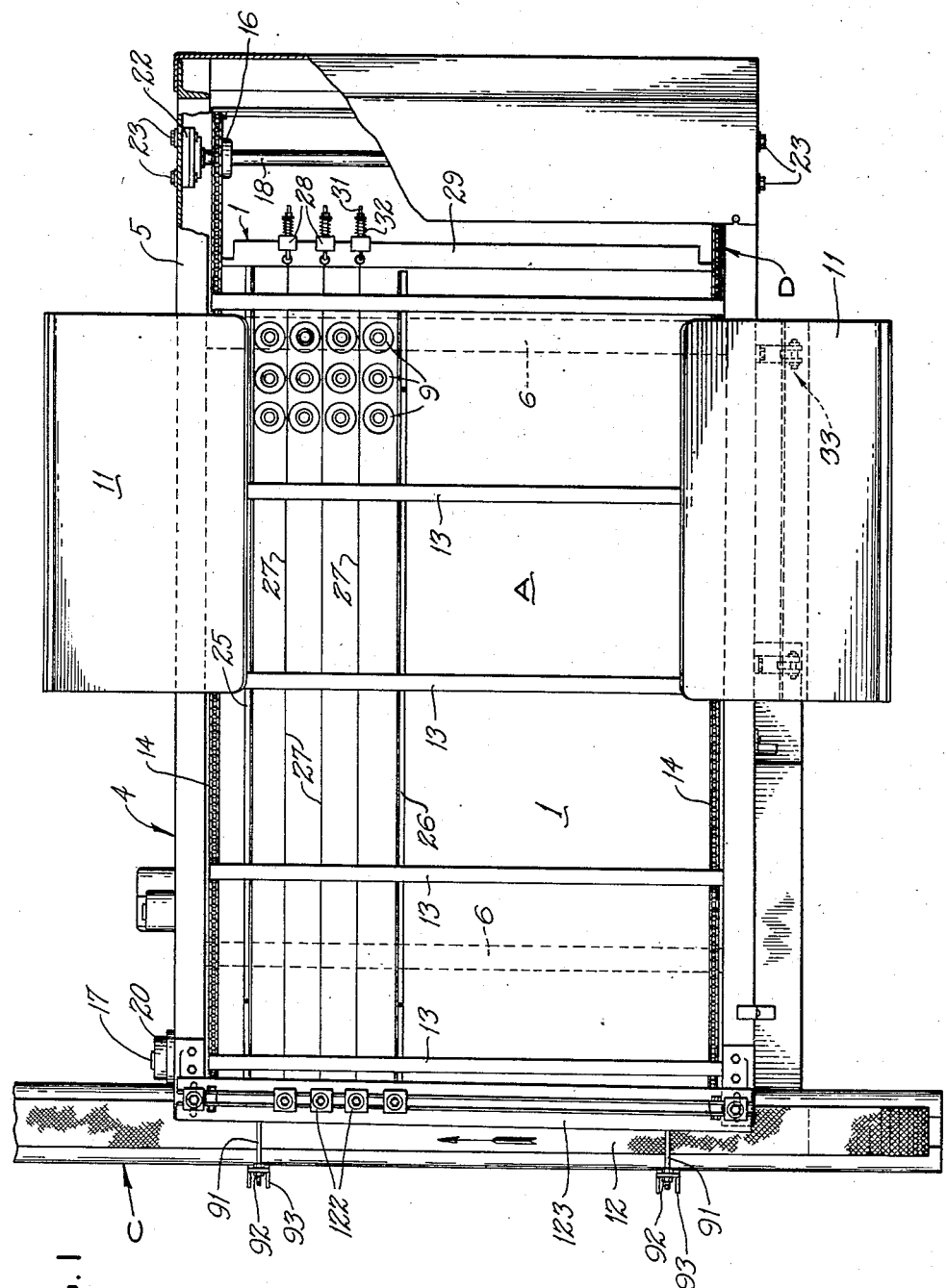
Fig. 1 is a plan view of an apparatus embodying the invention, a portion of a cover for one end thereof being partially broken away.

The apparatus comprises a substantially horizontal supporting surface A, Fig. 1, on which the bottles or other containers to be transferred and arranged may stand on their bottoms and be slid. As shown, the supporting surface A is generally rectangular in plan and may comprise the upper surface of a table, generally designated 1, Figs. 1, 3 and 4. As shown in Fig. 4, this table may comprise a smooth surfaced, thin, upper layer 1a which may be a thin sheet of aluminum or other suitable material; an intermediate layer 1b having good cushioning properties, as a sheet of linoleum; and a lower relatively strong and inflexible lower layer 1c which may be a sheet of steel having a thickness greater than that of the upper layer 1a or it may be any other suitable material having the requisite strength and rigidity.

The table 1 is supported at a desirable level above a floor, 2, Fig. 3, or other general supporting surface, by a suitable frame structure, generally designated B. This frame structure may comprise four corner uprights or legs 3, each of which may be adjustable to vary the effective height thereof in any suitable or preferred conventional manner, as by being made in upper and lower slideably overlapping and adjustably connected sections 3a and 3b, respectively, as shown in Fig. 2. Each upright or leg 3 also may be provided at its lower end with a supporting jack screw 3c resting upon the floor or supporting surface 2, Figs. 2 and 3, and individually adjustable for any useful purpose.

The uprights or legs 3 support a head frame, generally designated 4, in which the table 1 is mounted. This head frame may comprise a pair of longitudinal side frame members 5 which may be in the form of channels, each mounted on the two uprights 3 at that side of the apparatus (see Fig. 2) with the flanges of the channels turned inward or facing each other. See Fig. 3. The side frame members 5 may be fastened in place on the uprights 3 in any suitable or preferred known manner, as by welding. The head frame also comprises cross frame members 6, one of these being shown in Figs. 3 and 4 and two being indicated by dotted lines in Fig. 1. These cross frame members 6 have a length approximately the same as the width of the table 1 and may be fastened at their ends to the side frame members by any suitable known means, as by welding. As shown for one of the cross frame members 6 and one of the side frame members 5 in Fig. 4, the relative widths and cooperative arrangement of these parts may be such that the tops and bottoms, respectively, of the cross frame members 6 are spaced substantial distances below and above the levels of the top and bottom edges, respectively, of the side frame members 5. The table 1 may be supported upon the cross frame members 6 and be fastened thereto by conventional fastening means, as by cap bolts such as that indicated at 7 in Fig. 4 and there shown as extending through the lower layer 1c of the table and through an intervening spacing strip 8 before engaging the cross frame member 6. By this structural arrangement, the side frame members 5 extend above the table as indicated at 5a, Figs. 3 and 4, so as to provide longitudinally extending side guards for the supporting surface A.

The articles to be conveyed and arranged may be glass bottles, jars or other containers of any one of a wide range of sizes and shapes. Two specifically different bottles are indicated at 9 in Figs. 1, 3 and 4 and at 10 in Fig. 11. The articles may be unloaded upon the supporting surface A in a group having its components in a particular arrangement, as in four longitudinal rows of three bottles each as shown in Fig. 1, this being the arrangement of such bottles in a carton (not shown) from which they were unloaded. The group of bottles shown in Fig. 1 was unloaded from a carton which had been manipulated by a workman standing at one side of the table. Pivoted carton rest shelves 11 are provided for use in unloading groups of bottles from cartons onto the supporting surface A, as hereinafter will be further explained. Each group of bottles, in the order in which deposited on the supporting surface A, may be moved on such surface to the delivery end thereof, this being the left-hand end of such supporting surface as shown in Fig. 1. From the delivery end of the supporting surface, successive front rows of the group of bottles are impelled from the supporting surface onto the upper stretch 12 of an outgoing cross conveyor, generally designated C. The direction of movement of this upper stretch of the conveyor is transverse to the direction of length of the supporting surface A as indicated by the direction arrow in Fig. 1. Successive front rows of a group of bottles transferred thereto will be disposed in a single file thereon.

To move the bottles on the supporting surface A and to transfer them to the outgoing conveyor, as just described, the apparatus includes an article moving mechanism, generally designated D, Figs. 1 and 3. This comprises spaced transverse pusher bars 13 carried by endless chains 14 which respectively are operatively supported within the head frame structure 4 at opposite sides of the table 1, the arrangement being such that the transverse pusher bars 13 are moved intermittently by their chains along an endless path having a portion extending longitudinally of the supporting surface A sufficiently above the latter for effective pushing contact with the bottles to be moved on the supporting surface.

The endless chains 14 are mounted on front sprockets 15 and rear sprockets 16, the front sprockets 15 being mounted on a transversely disposed axle 17 in the head frame at the end thereof nearest to the outgoing cross conveyor C and the rear sprockets 16 being carried by a transversely extending axle 18 mounted in the opposite end portion of the head frame. As shown, the forward ends of the side frame members 5 are horizontally slotted at 19, Fig. 4, to accommodate the extremities of the axle 17 so that bearings, designated 20, Fig. 3, for such axle may be located on the outer sides of the side frame members 5 and fastened thereto by any suitable fastening means (as by bolts 21 or the like), as indicated for one of the bearings 20 in Fig. 2. The ends of the rear axle 18 may be mounted in bearings located on the inner sides of the side frame members 5, as shown for one of these bearings at 22 in Fig. 1, these bearings being adjustably fastened to the side frame members 5 by fastening devices 23 extending through longitudinal slots 24 in the side frame members 5 as illustrated in Fig. 2. The arrangement is such that the chains 14 are kept desirably taut and any slack therein may be taken up by adjustment of the rear axle bearings 22.

The group of articles deposited on the surface A between two adjacent pusher bars 13 may be moved on the supporting surface in longitudinal rows. The group of bottles on the supporting surface in Fig. 1 consists of four longitudinal rows of three bottles each. The apparatus of the invention includes article guiding means cooperative with the transverse pusher bar 13 at the rear of this group of articles so that they will be kept in such rows during movement thereof on the supporting surface A for transfer to the outgoing conveyor C. Article guiding means in a form suitable for bottles such as those shown in Fig. 1 comprises a pair of longitudinally extending main guide rails 25 and 26, respectively, mounted on the supporting surface A so as to be spaced apart a distance corresponding approximately to the transverse dimension of the carton containing the group of articles shown in Fig. 1. The space between the main guide rails 25 and 26 is divided longitudinally into an appropriate number of longitudinal guideways for the longitudinal rows of bottles involved by lengths of thin wire, indicated at 27, which may be piano wire or the like, the width of each of these guideways being just sufficient to accommodate a longitudinal row of the articles without allowing any appreciable lateral drift of any of such articles from its row. These wires 27 may have their rearward ends connected to adjustable fastening blocks 28 on a transverse strip 29 which is mounted on the rear edge of the table 1 while the forward ends of the wires may be connected to a transverse fastening strip 30 which is connected to the front edge of the table 1 and has its upper surface flush with the upper surface of the table 1 proper so as to form part of the supporting surface A. Preferably, the wires 27 are spring tensioned, the rearward ends thereof being fastened to pins 31 which extend slideably through the blocks 28 and are spring loaded at 32 at the rear of the blocks 28. These wires, while of relatively small diameter, will exert a sufficient guiding action on the bottom portions of the articles 9 to keep them in longitudinal rows. The guiding means just described is well adapted to permit and facilitate desirable manipulation of a carton containing the bottles during unloading thereof onto the supporting surface A. In unloading such a group of articles, a carton containing them may be placed on the adjacent pivoted shelf 11 when the latter has been swung outwardly about its pivotal axis to the position shown in Figs. 1 and 3, the shelf being supported as at 33 on the side of the head frame for limited outward and inward swinging movements. The pivoted shelf supporting the carton then may be swung inwardly from the position of the shelf shown. The carton, in an inverted position with the lower flaps thereof open, then may be slid from the unloading shelf with the leading lower side edge of the carton sliding across the wires 27 until it contacts with the main guide rail 26, at which time the trailing side wall of the carton will be in contact at its lower edge with the main guide rail 25. Lifting of the carton from the articles will leave them in four longitudinal rows of three each or, otherwise stated, in three transverse rows of four each as shown in Fig. 1, each of these longitudinal rows being disposed between two adjacent longitudinal guide elements, i. e., between two adjacent wires 27 or between a wire 27 and a main guide rail 25 or 26.

It is to be understood that with a supporting surface A of the width shown in Fig. 1, for example, guideways would be provided in the manner and by means such as before described on the opposite approximately longitudinal half portion of the supporting surface into which articles could be unloaded in the manner described, utilizing the second shelf 11. It also will be understood that the guideway-defining guide elements and the spacing between them may be varied to meet various conditions of service as to transfer articles of different shapes and dimensions or to receive different sized groups of articles from specifically different cartons, etc. Also, that the entire surface A may be divided into longitudinal guideways, each of a suitable width, and the groups of articles to be transferred and arranged may be unloaded onto the supporting surface A from the rear thereof or from one or both of the sides thereof and also from the rear.

The transverse pusher bars 13 project beyond the carrier chain 14 at one side of the apparatus as indicated at 13a in Figs. 3 and 6. These pusher bars may be fastened to the carrier chains in any suitable manner. An attaching apertured ear or lug 34 on the underside of each pusher bar as shown for the pusher bar in Fig. 6, just inwardly of the adjacent carrier chain and a pivotal connection between the chain and the pusher bar is effected by providing hinge pins 35, Fig. 5, of the chain of sufficient length to extend through the fastening ear or lug 34 of the pusher bar as indicated at 36, Fig. 6. A similar pivotal connection of the opposite end of the bar with the other chain may be provided. The assembly of pusher bars and chains may be maintained by suitable conventional fastening means. The projecting ends 13a of the pusher bars at one side of the apparatus as shown in Fig. 3 serve a purpose hereinafter to be explained.

The pusher bars are moved in unison intermittently for predetermined adjustable distances by a suitable driving mechanism, generally designated E. This driving mechanism may comprise a motor 37 mounted on a supporting platform 38 which may be supported by the uprights 3 at a level well below that of the head frame 4. The motor 37 is operatively connected by an adjustable transmission, as by the adjustable pulley 39 and belts 40 and 40a with a reduction gear unit 41 having a driven shaft 42, Figs. 2 and 3, which is the main drive shaft of the mechanism for driving the article moving means of the apparatus. The shaft 42 carries a crank arm 43, Figs. 2, 3, 8 and 9, with which one end of a connecting rod 44 is adjustably and pivotally connected at 45. The connecting rod 44 is pivotally connected at its opposite end at 46, Figs. 2 and 3, with a rocker arm 47 on an outer member 48 of a one-way clutch or coupling, designated 49, on the adjacent outer end of the front axle 17. The clutch 49 includes an inner clutch member 50 which is keyed, as indicated at 51, Fig. 7, to the axle 17. Provision is made by ball clutch elements 52 in triangular spaces 53 between the outer clutch member 48 and the inner clutch member 50 as shown in Fig. 7 so that the outer clutch member may turn angularly in a clockwise direction free from the inner clutch member but will be clutched to the inner clutch member on reversal of this movement. A counterclockwise movement of the outer clutch member 48 therefore will effect a like turning movement of the inner clutch member 50 and the axle 17. Thus, when the drive shaft 42 is turning in one direction, as in a clockwise direction as indicated in Fig. 2, the inward stroke of the connecting rod 44 will be free from the front axle 17 but its outward, return stroke will impart a rotary motion to the axle 17 of a predetermined extent and hence will move the chains 14 and advance the pusher bars carried thereby in unison a predetermined distance along their path of movement and relative to the supporting surface A. This distance may be varied by adjustment of the pivotal connection of the connecting rod 44 with the crank 43 which may be effected in a well known manner by the conventional adjusting means shown, indicating means being provided, as indicated at 54, Figs. 2 and 8, to show the amplitude of movement of each pusher bar for each intermittent turning movement of the axle 17 by the rocker arm 47 with a given adjustment of the pivotal connection of the connecting rod 44 with the crank arm 43. Each such movement of a pusher bar preferably has an amplitude corresponding to the diameter of each bottle or similar article that is being pushed on the supporting surface A by that pusher bar.

The connecting rod 44 preferably comprises telescopic overlapping sections respectively designated 44a and 44b, the section 44a fitting in the section 44b which is tubular and carrying a transverse pin 55 projecting from a slot 56 in the section 44b, this pin being connected by tension coil springs 57 with attaching lugs 58 on the end of the section 44b. The working stroke of the connecting rod thus is effected through the tension spring means and the connecting rod will be automatically longitudinally compressed by an undue pressure or load imposed on the section 44b of the connecting rod, as by a jam of articles or some obstruction in the path of a pusher bar. Any other spring loaded, variable length connecting rod structure may be employed in lieu of that specifically shown and described and provision may be made to dampen any return relative movement between the parts of the connecting rod to extend it to its working length after such an obstruction or undue load has been removed.

The operation of the apparatus as just described will effect intermittent movement of each group of articles on the supporting surface A in advance of a transverse pusher bar, motion being transmitted thereby to successive transverse rows in advance of the rear transverse row against which the bar is pushing. All groups on the supporting surface will be moved intermittently or step-by-step in unison by their individual pusher bars and each successively presented front transverse row of articles arriving at the delivery end of the supporting surface will be pushed therefrom onto the upper stretch 12 of the outgoing conveyor C. The path of movement of each pusher bar will be curved in a direction having a downward component as the pusher bar completes propulsion of the last transverse row of articles in advance thereof from the delivery end of the supporting surface onto the outgoing conveyor as the portions of the chains 14 carrying that bar start to move around the front sprockets 15. Because of the width of the pusher bar 13 and the desirability of having more space between adjacent pusher bars than the length of each of the longitudinal rows of articles deposited therebetween, the action of the pushers as so far described would produce a gap between the rear or last transverse row of articles, a group transferred to the outgoing conveyor by each pusher bar and the first transverse row of articles of the group similarly transferred by the immediately following pusher bar. The present invention obviates this gap by including in the drive mechanism intermittently acting means to actuate the article pusher mechanism in the intervals between actuation thereof by the main actuating mechanism as so far particularly described. This auxiliary driving mechanism comprises a crank arm 59 on the opposite end of the main drive shaft 42 from that provided with the crank arm 43. See Fig. 3. The crank arm 59 may be generally similar to the crank arm 43 or, as shown, a simple crank pivotally connected to one end of a connecting rod 60 which may be generally similar to the connecting rod 44. The connecting rod 60 is pivotally connected at its opposite end at 61, Figs. 2 and 3, to a rocker arm 62 on a rock shaft 63. This rock shaft extends transversely of the apparatus below the head frame structure, being appropriately journaled in bearings 64 and 65, respectively, Fig. 3, mounted on the head frame structure. The rock shaft 63 carries a rocker arm 66, Figs. 2 and 10, which extends upwardly at the outer side of the adjacent side frame member 5. This side frame member is provided with a cutout 67 through which projects a fastening stud 68 by which a connecting arm 69 is pivotally and adjustably connected with the rocker arm 66. The connecting arm 69 extends along the inner side of the side frame member 5 to a rocker arm 70, Figs. 3, 5 and 6, on a sleeve or collar 71 loose on the axle 17, the connection between the connecting arm 69 and the rocker arm 70 being pivotal at 70', Fig. 5. The collar or sleeve 71 carries a projecting arm 72, extending at an approximate right angle with the rocker arm 70 and recessed to provide a pocket 73, covered by a cover plate 74 and housing a spring loaded pawl 75. The pawl 75 is continuously urged by its loading spring, indicated at 76, to protrude from the pocket 73 in the arm 72, as shown in Fig. 5, to an extent sufficient to contact and push ahead of it one of the transverse pusher bars 13 when the latter has just disengaged or moved out of contact with its last transverse row of articles previously pushed thereby and is located at the approximate position shown in Fig. 5. The pawl has its outer end portion rearwardly beveled, as at 75a, for a purpose to be presently explained.

The stud 68 of the connection between the rocker arms 66 and the connecting arm 69 carries a pair of spaced arms 77 and 78, respectively, Fig. 10, straddling the rocker arm 66 which is slotted at 79 to permit the stud 68 to pass therethrough, this slot being arcuate to permit bodily positioning of the stud 68 at any place along its length without causing a change in the starting position of the pawl 75 while effecting a change of amplitude of its stroke. The arms 77 and 78 carry a traveler 80 which is in threaded engagement with an adjusting screw 81 carried by the rocker arm 66. The adjusting screw 81 is provided at one end with a knurled handle or knob 82 which may be turned to raise or lower the stud 68 in the slot 79. This adjusted position of the stud 68 in the slot 79 may be secured by tightening a knurled clamping nut 83 on the outer end of the stud 68. The stud 68 carries a pointer 84 which is cooperative with a scale 85 on a plate 86 on the rocker arm 66 to indicate the amplitude of the throw of the pawl 75 produced by a given adjustment of the stud 68 along the rocker arm 66. The amplitude of the throw of the rocker pawl may be varied by the adjusting means just described. Preferably, this is predetermined to be just sufficient to obviate a gap on the outgoing conveyor between the front transverse row of a group of articles at the rear of a pusher bar and the rear transverse row of the immediately preceding group of articles in front of that bar. The working stroke of the rocker pawl may be from the full line position of Fig. 5 to the dotted line position in the same view or may be any part of this distance. The bevel at 75a on the outer end of the rocker pawl permits the pawl to be biased into its pocket against the spring 76 so as to pass underneath any transverse pusher bar encountered on its return stroke. The forward working strokes of the rocker pawl take place in alternation with the working strokes of the primary actuating means or, in order words, during the return strokes of the rocker arm 47 and connecting rod 44. When a transverse pusher bar 13 has been brought to an appropriate position, such, for example, as that shown in Fig. 6, the next working stroke of the rocker pawl will push that bar ahead of the pawl and thereby actuate the article moving mechanism D so as to obviate a gap on the outgoing conveyor between successively transferred transverse rows of articles as hereinbefore explained. Other working strokes of the pawl may be idle so far as actuation of the article moving mechanism is concerned.

The apparatus may be used to transfer and arrange bottles or other containers of a wide variety of shapes and sizes. These may include containers having bodies which are oblong in cross-section or are otherwise non-circular. In transferring bottles such as those shown at 10 in Fig. 11, for example, it may be desirable to effect spreading of adjacent bottles by the time their transfer has been completed so as to permit the individual bottles to turn 90° about their vertical axes during the transfer without interfering contact of adjacent bottles with each other. The guide means provided on the supporting table may then comprise spaced longitudinal guide elements 87 fastened, as by screws 88, to a removable delivery end section 89 of the supporting table of the apparatus, these guide elements 87 enlarging in width toward their outer ends so as to progressively increase the space between adjacent bottles as they approach the delivery edge of the table. Each of the articles 10 then will have room to turn through 90° so that its major transverse axis will be disposed in the direction of bodily movement thereof on the outgoing conveyor belt, as was the case while such articles were moved between the longitudinal guide elements 87.

In turning about their vertical axes during the transfer as illustrated in Fig. 11, the bottles 10 may pivot around vertical edges 220 of depending rigid guide bars 221, shown as angle irons, hanging from an overhead horizontal supporting bar 222. The latter may support the depending bars 221 along a line slightly oblique to the direction of travel of the outgoing conveyor with the distance between the bars 221 and the longitudinal center line of the outgoing conveyor decreasing slightly in an upstream direction. This is to aid in assuring adequate clearance between adjacent bottles during their transfer onto the outgoing conveyor. The depending rigid guide bars 221 may be provided with wire spacing clips 223 to prevent raised lettering or the like (not shown) on the bottles from rubbing against the rigid bars 221 during the transfer.

The invention also provides a yielding article steadying means for use, if desired or needed, to steady non-circular or other bottles or articles during their transfer. This means also is useful in that it automatically will stop the operation of the driving mechanism of the apparatus should a jam of articles occur during their transfer. The steadying means, Figs. 2 and 4, comprises a transversely disposed contact member 90, shown as a rod, having outwardly extending attaching stems, indicated at 91, fastened adjustably at 92 to the upper end portions 93 of arms 94 which are generally L-shaped and are mounted at the ends of their lower portions on a rock shaft 95. See also Fig. 3. This rock shaft 95 may be carried by bearings 96 on brackets 97 attached to the head frame structure. These brackets also may serve as part of a supporting structure for the conveyor C. The arms 94 are rigidly connected through the rock shaft 95 to an actuating rocker arm 96, the outer end of which is pivotally connected by a pivot element 99 to a connecting bar 100. As best seen in Fig. 4, this connecting bar 100 has a longitudinal slot 101 through which the main drive shaft 42 extends so that a roller 102 on the end of the bar 100 rides on a cam 103 on the shaft 42 at the far side of the cam from the pivoted end of the bar. A rod 104 which is pivotally mounted at 105 on the pivot element 99 is slideably supported at 106 by a depending hanger 107 so that a block 108 which is mounted on the rod 104 and is adjustable longitudinally thereof is in supporting relation to a roller 109 on a pivoted actuating arm 110 of a micro-switch 111. The latter is suspended from a bracket 112 which may be carried by one of the uprights or legs 3. A coil spring 113 is connected at one end by a pin 114 to the free end of the rod 104 and at its opposite end to an apertured lug 115 on the fixed hanger 107. As best seen in Fig. 4, the block 108 is a cam block and has its roller supporting upper surface formed to provide a rise or inclined portion 116 connecting a low portion 117 with a higher portion 118. With the block 108 in the position on the rod 104 shown in Fig. 4, the roller 109 on the arm 110 for actuating the micro-switch 111 will remain on the lower level portion 117 of the cam block during longitudinal movement of the rod 104 from the full-line position shown in Fig. 4 to the first dot-and-dash line position which is indicated at 119. On further movement of the arm 94 to the second dot-and-dash line position, indicated at 120, the roller 109 will ride up the rise 116 on the cam block onto the higher level surface portion 118 thereof and thereby operate the arm 110 to open the micro-switch 111 which is normally closed. This will stop the operation of the driving mechanism of the apparatus. Movement of the arm 94 to the second dot-and-dash line position will take place when there has been a jam of articles in the process of transfer to the outgoing conveyor.

In the use of the steadying mechanism, a transverse row of bottles or the like will be moved by a pusher bar 13 against the yieldable transverse contact rod 90 when the latter is in the full line position of Fig. 4. The cam 103 may be so laid out and its angular setting on the shaft 42 may be such that the initial outward movement of the contact rod 90 may be caused by the contact and pressure of the oncoming transverse row of bottles but soon will be taken over by the cam which will continue the outward movement of the rod 90 at the same speed as that of the bottles. Movement of the rod 90 to the first dot-and-dash line position of Fig. 4 will clear the bottles so that they may be moved by the outgoing conveyor free from contact with the rod. However, until the outgoing conveyor has taken over the support and movement of the bottles, the pressure of the contact rod 90 against such bottles will hold them steady and prevent unintended or irregular turning or other movements of the individual bottles during their transfer.

Figs. 1, 2 and 3 show the apparatus equipped with a different form of guiding mechanism than that shown in Fig. 11 for guiding and controlling the spacing between adjacent bottles of a transverse row, particularly bottles which are relatively tall and therefore more easily overturned, during transfer of such bottles to the outgoing conveyor.

Such guiding mechanism may comprise straight guide blades or fingers 120 depending from holders 121 carried by clamps 122 which are adjustably supported by a transversely extending overhead supporting rail structure 123. The latter may be mounted on brackets 124 on the head frame structure. The depending guide elements 120 guide the individual bottles of a transverse row during their movements from the stationary supporting surface of the apparatus onto the moving outgoing conveyor. They may be so formed and relatively positioned as to guide all the articles of each transverse row onto the outgoing conveyor without permitting interference by the relatively downstream articles and those further upstream. The line along which the guide elements 120 are supported may thus be nearer at its upstream end to the longitudinal median line of the outgoing conveyor than at its downstream end, as in the case of the guides 220 of the Fig. 11 form of structure.

Various changes in and modifications of the illustrative forms of the apparatus shown in the drawings and herein particularly described will now be obvious to those skilled in the art and I, therefore, do not wish to be limited to the details thereof.

I claim:

1. Apparatus for receiving groups of bottles, jars or the like and for moving them and arranging them in a single file order, comprising a substantially horizontal supporting surface for groups of said articles, a substantially horizontal outgoing conveyor positioned at one end of said supporting surface for cooperation therewith, means to move spaced groups of said articles, each comprising a plurality of transversely extending rows, on the supporting surface so that successive front transverse rows of each group will be moved intermittently in turn over said end of the supporting surface onto said outgoing conveyor, and auxiliary means cooperative with said means to move said spaced groups of articles on the supporting surface to impart a further movement thereto at the conclusion of the movement of the last transverse row of each group from the supporting surface to obviate on the outgoing conveyor gaps between successive rows of articles delivered thereto from successive groups on the supporting surface.

2. Apparatus of the character described comprising a substantially horizontal stationary supporting surface on which groups of bottles, jars or the like may be placed so that the articles of each group comprise a plurality of successive transverse rows and said groups are spaced longitudinally of said supporting surface, a horizontal conveyor located at one end of said supporting surface in position to permit each of successive transverse rows of articles of each of said groups to be moved in turn from said end of the supporting surface onto said conveyor in a single file order on the latter, means to move said groups of articles on said supporting surface to said end thereof and successive front transverse rows of each of said groups from said end onto said conveyor, and auxiliary means to actuate said first-named means to advance the articles on the supporting surface a distance approximating the spacing between successive groups thereon each time the last transverse row of a group has been moved by said first-named means onto said conveyor.

3. Apparatus of the character described comprising a substantially horizontal stationary supporting surface for groups of bottles, jars or the like, each comprising a plurality of successive transverse rows of such articles, a conveyor cooperatively positioned at one end of said supporting surface to receive and carry away in a single file order each transverse row of articles moved thereonto from said supporting surface, article moving means comprising uniformly spaced transverse article pusher bars respectively located in pushing relation to the successive groups of articles on said supporting surface and operating means for the pusher bars constructed and arranged to actuate them so that each pusher bar in turn is advanced step-by-step longitudinally of said supporting surface toward and beyond said end thereof while in pushing relation to the group of articles immediately preceding it so as to transfer the transverse rows composing said group successively onto said conveyor, and auxiliary actuating means for said pusher bars to advance them further a distance approximating the longitudinal distance between successive groups of articles on the supporting surface each time one of said pusher bars has moved the last transverse row of its group from said supporting surface onto said conveyor.

4. Apparatus as defined by claim 3 and in combination therewith spaced longitudinally extending article guideway-defining elements on said supporting surface to maintain the articles of said groups in adjacent longitudinal paths during movement thereof by said pusher bars.

5. Apparatus of the character described comprising a substantially horizontal stationary supporting surface for bottles, jars and the like, a substantially horizontal conveyor at one end of said supporting surface in position to receive articles moved thereonto from said end of the supporting surface in position to receive articles moved thereonto from said end of the supporting surface, article moving means comprising a pair of endless chains located at the opposite sides of said supporting surface and means movably supporting them so that upper stretches of said chains extend parallel to said supporting surface at a slightly higher level to said one end thereof and then downwardly between the supporting surface and said conveyor, a plurality of regularly spaced transverse pusher bars carried by said chains for movement therewith, the spacing between adjacent transverse pusher bars being such that a group of articles arranged in a plurality of successive transverse rows may be deposited on the supporting surface at a receiving station in advance of any pusher bar that is appropriately positioned at that time, longitudinal guideway-defining means on said supporting surface for the component articles of said transverse rows, operating means to drive said chains to advance the pusher bars which are in pushing relation to groups of articles on the supporting surface step-by-step toward said conveyor, and auxiliary means to drive said chains to advance said pusher bars further a distance substantially equal to the longitudinal distance between adjacent transverse rows of articles of groups respectively located between adjacent pusher bars whenever any of said pusher bars has been advanced by said operating means to push ahead of it onto said conveyor the last transverse row of its group of articles.

6. Apparatus as defined by claim 5 wherein said longitudinal guideway-defining means comprise longitudinally extending rigid guide elements at the ends of the transverse rows and longitudinally extending thin wires spaced between said rigid guide elements to provide a transverse series of longitudinal guideways for the several articles of each transverse row.

7. Apparatus as defined by claim 6 wherein said longitudinally extending wires are spring tensioned.

8. Apparatus of the character described comprising a substantially horizontal stationary supporting surface for bottles, jars or the like, an outgoing cross conveyor at one end of said supporting surface in cooperative relationship therewith, article moving means comprising spaced transversely extending pusher bars and endless chain means carrying said pusher bars for movement along an endless path having a portion thereof extending slightly above and parallel to said supporting surface to said end of the latter next to the conveyor and then downwardly between the supporting surface and the conveyor, primary driving means to actuate said chain means to advance said pusher bars along said portion of the path of movement step-by-step, and auxiliary means to actuate said chain means to further advance said pusher bars along said path intermittently at regularly spaced intervals coming between certain of the actuations of the chain means by said primary driving means.

9. Apparatus as defined by claim 8 wherein said primary driving means is adjustable to vary the amplitude of the step-by-step movements of said pusher bars.

10. Apparatus as defined by claim 9 wherein said auxiliary means is adjustable to vary the amplitude of the further advance movements of the pusher bars effected thereby.

11. Apparatus of the character described comprising a substantially horizontal supporting frame comprising a pair of spaced longitudinally extending side frame members, longitudinally spaced transversely extending rotatable axles extending between and carried by said side frame members, a substantially horizontal stationary table mounted in said frame between said side frame members and above said axles, sprockets on said axles at the sides of said table, endless chains carried by said sprockets, transverse pusher bars carried by said chains for movement therewith along a path extending above and adjacent to the upper surface of said table at a level thereabove suitable for said pusher bars to push bottles, jars or the like on the table to and beyond one end of the latter, a horizontal outgoing conveyor located adjacent to said one end of the table in position to receive and carry away in single file order articles pushed thereonto from said end of the table by said pusher bars, driving means for one of said axles comprising a one-way clutch mounted on said axle, a rocker arm operatively connected to said clutch to turn said axle to effect movement of the pusher bars above the table toward said conveyor when said arm is rocked in one direction and to swing free of the axle upon return movement of the rocker arm, a continuously rotating shaft, a crank arm thereon, and a spring loaded link operatively connecting said rocker arm and said crank arm, and auxiliary means to intermittently drive said one axle in alternation to the driving thereof by said first-named driving means.

12. Apparatus as defined by claim 11 wherein said auxiliary driving means comprises a crank arm on said drive shaft, a rocker pawl loose on said axle, adjustable linkage and lever motion transmitting means between said last-named crank arm and said rocker pawl for intermittently imparting working strokes to the latter, said rocker pawl being in position to engage and advance a pusher bar on a working stroke thereof after such pusher bar has arrived at the position it assumes when it has pushed the last transverse row of the articles in advance thereof from said table onto said outgoing conveyor.

13. Apparatus of the character described comprising a substantially horizontal stationary supporting surface for bottles, jars or the like, a substantially horizontal outgoing conveyor at one end of the supporting surface adjacent thereto and flush therewith, a series of spaced transverse pusher bars and means supporting and operating them in unison in relation to said supporting surface to push successive transverse rows of articles from said end of the supporting surface onto said conveyor, and means comprising a yieldable elongate transverse article contact member arranged to press against the articles of each transverse row at the side thereof opposite that in contact with a pusher bar during pushing of said transverse row of articles by the pusher bar from said supporting surface onto said conveyor.

14. Apparatus of the character described comprising a substantially horizontal stationary supporting surface for bottles, jars or the like, a substantially horizontal conveyor at one end of the supporting surface and in position to receive articles therefrom, a series of spaced transverse pusher bars and means supporting and operating them in unison in relation to said supporting surface to push successive transverse rows of articles from said end of the supporting surface onto said conveyor, and means cooperative with said transverse pusher bars to steady said transverse rows of articles during transfer thereof from the supporting surface onto the conveyor, said last-named means comprising a yieldable transverse rod to contact each transverse row of articles at the side of the latter opposite that in contact with a pusher bar during movement of said row of articles by the pusher bar from the supporting surface onto the conveyor, a swingable lever carrying said transverse rod so that the latter may yield in a direction away from the pusher bar under pressure from the transverse row of articles being moved onto the conveyor, and cam actuated means for operating said lever to move said transverse rod in the direction of its yielding movement at a speed synchronized with the movement of the pusher bar.

15. Apparatus as defined by claim 14 wherein said yieldable transverse rod is movable under pressure from a jam of oncoming articles beyond its throw by said cam actuated means, a normally closed micro-switch having an operation-controlling connection with the means for operating the pusher bars, and means operable by an excessive movement of said yieldable transverse rod as a result of such a jam to open said microswitch.

16. Apparatus as defined by claim 14 and, in combination therewith, transversely spaced depending guide means located above the zone of transfer of articles from the supporting surface onto said conveyor to space apart and direct the individual articles of each transverse row in transit from the supporting surface to the conveyor.

17. Apparatus as defined by claim 14, and, in combination therewith, transversely spaced depending article guiding and directing members located above the zone of transfer of articles from the supporting surface onto said conveyor in a row extending generally transversely of the receiving surface and having the end thereof upstream of the conveyor nearer to the longitudinal median line of the conveyor than the down-stream end thereof.

18. Apparatus as defined by claim 14 and, in combination therewith, transversely spaced depending article guiding and directing members located above the zone of transfer of articles from the supporting surface onto said conveyor, and longitudinal guide elements on said supporting surface having their end portions next to the conveyor formed to widen the space between adjacent non-circular articles of a transverse row to obviate interference therebetween during transfer thereof from said supporting surface onto said conveyor.

EVERETT O. HILLER.

REFERENCES CITED

The following references are of record in the file of this patent:

UNITED STATES PATENTS

| Number | Name | Date |
| --- | --- | --- |
| 724,240 | Baker | Mar 31, 1903 |
| 1,092,609 | Taliaferro | Apr. 7, 1914 |
| 1,352,607 | Jones | Sept. 14, 1920 |
| 1,476,023 | Phelps | Dec. 4, 1923 |
| 1,612,215 | Phelps | Dec. 28, 1926 |